(12) United States Patent
Nakamura et al.

(10) Patent No.: US 7,006,332 B2
(45) Date of Patent: Feb. 28, 2006

(54) DISK DRIVE COMPRISING SUSPENSION FOR MAGNETIC HEAD WITH POSITIONING OF SLIDER TO PREDETERMINED TRACK THROUGH OSCILLATION OF VOICE COIL MOTOR

(75) Inventors: Hajime Nakamura, Takefu (JP); Takehisa Minowa, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 120 days.

(21) Appl. No.: 10/345,309

(22) Filed: Jan. 16, 2003

(65) Prior Publication Data

US 2004/0130830 A1 Jul. 8, 2004

(30) Foreign Application Priority Data

Jan. 8, 2003 (JP) ................................ 2003-001949

(51) Int. Cl.
*G11B 5/56* (2006.01)

(52) U.S. Cl. .................................. 360/294.3
(58) Field of Classification Search ............. 360/294.3, 360/294.5, 294.6
See application file for complete search history.

(56) References Cited

U.S. PATENT DOCUMENTS

| | | | | |
|---|---|---|---|---|
| 5,657,188 A | * | 8/1997 | Jurgenson et al. | ....... 360/294.3 |
| 6,078,473 A | | 6/2000 | Crane et al. | |
| 6,295,185 B1 | | 9/2001 | Stefansky | |
| 6,335,850 B1 | * | 1/2002 | Dunfield et al. | ......... 360/294.5 |
| 2002/0141117 A1 | | 10/2002 | Kasajima et al. | |
| 2002/0154447 A1 | | 10/2002 | Kasajima et al. | |

FOREIGN PATENT DOCUMENTS

EP         0 442 225 A2       8/1991

OTHER PUBLICATIONS

S. Koganezawa et al., IEEE Transactions on Magnetics, vol. 35, No. 2, pp. 988–992, Mar. 1999.
L.-S. Fan et al., IEEE Transactions on Magnetics, vol. 35, No. 2, pp. 1000–1005, Mar. 1999.
L. Koganezawa et al., IEEE Transactions, vol. 32, No. 5, pp. 3908–3910, Sep. 1996.

* cited by examiner

*Primary Examiner*—A. J. Heinz
(74) *Attorney, Agent, or Firm*—Birch, Stewart, Kolasch & Birch, LLP

(57) ABSTRACT

A suspension for magnetic head, for supporting a magnetic head slider on which a magnetic head for recording/reproduction of information on a magnetic recording medium is mounted, wherein one end of the suspension is fixed to a stator portion fixed to the tip end of a load beam of the suspension, a gimbal portion and a rotor portion oscillatably supported by metallic micro-beams formed by bending are provided on the side of the other end of the suspension, and the magnetic head slider is attached to the gimbal portion, whereby the rotor portion and the magnetic head slider attached to the gimbal portion as one body with the rotor portion can be oscillated in parallel to the surface of a magnetic recording disk, independently of the driving of the slider by a coarse actuator.

19 Claims, 10 Drawing Sheets

DISK DRIVE COMPRISING SUSPENSION FOR MAGNETIC HEAD WITH POSITIONING OF SLIDER TO PREDETERMINED TRACK THROUGH OSCILLATION OF VOICE COIL MOTOR

BACKGROUND OF THE INVENTION

The present invention relates to a suspension for a magnetic head in a magnetic recording disk drive.

A magnetic recording disk drive is a system for performing recording/reproduction of information by scanning a magnetic head over a rotating ferromagnetic medium, or a magnetic recording disk, and is widely used as the center of storage devices for supporting the modern information age. The magnetic head is contained in a slider, which is flying over the magnetic recording disk with a gap on the order of nanometers therebetween at the time of recording/ reproduction. A driving force for moving the magnetic head to a predetermined position is generally generated by a voice coil motor (VCM). The coil of the voice coil motor is connected to an arm rotatably supported by a pivot, and, further, a magnetic head slider is attached to the tip end of the arm via a suspension and a gimbal. The suspension is a spring member for generating a load which balances with the flying height of the slider, and the gimbal is a spring member which supports the slider and which absorbs the inclinations arising from assemblage and the surface oscillations of the disk without spoiling follow-up performance for tracking, by undergoing elastic deformations in the directions other than planes parallel to the disk surface. With this structure, the magnetic head can be moved to a predetermined track on the rotating disk while maintaining a stable condition.

In recent years, the recording density of the magnetic recording disk drives has been enhanced (i.e., the track width has been reduced) more and more, and, since the magnetic head must be accurately positioned on the narrow track, it is necessary to enhance the accuracy in positioning the head. Conventionally, the positioning of the head has been conducted by only a large actuator such as the above-mentioned voice coil motor; however, this system does not have a sufficient precision for the narrowed track width. In view of this, a mechanism for high-precision positioning or a micro-actuator has come to be indispensable for high recording density disk drives.

A variety of micro-actuators have hitherto been proposed for achieving the high-precision positioning, and they can be generally classified, on the basis of driving force, into three types, i.e., (1) electrostatic force, (2) electrostriction of piezoelectric material, and (3) electromagnetic force.

The conventional micro-actuator utilizing the electrostatic force of type (1) above (Fan et al., IEEE TRANSACTIONS ON MAGNETICS, Vol. 35, No. 2, Mar. 1999, pp. 1000–1005) has a structure in which a pair of mesh form electrodes are arranged between the gimbal and the slider, and the actuator portion is produced by Ni plating, thereby promising good productivity.

However, since the pair of electrodes are connected by a plurality of beams which have been finely processed and the lower electrode and the slider are oscillatably supported by fine beams, it is difficult to enlarge the displacement amount while maintaining strength. In addition, since the weight of the slider portion for supporting is too large as compared with the electrostatic force generated, resonance occurs at around 1 to 2 kHz, so that the servo band cannot be enlarged.

As a countermeasure against this problem, it may be contemplated, for example, to make the actuator itself as a capacitor and feed back the signal; however, such an approach would complicate the system itself. Thus, this system has not yet been put to practical use.

The conventional micro-actuator utilizing the piezoelectric material of type (2) above (Koganezawa et al., IEEE TRANSACTIONS ON MAGNETICS, Vol. 35, No. 2, Mar. 1999, pp. 988–992) has, for example, a structure in which two piezoelectric elements are disposed in a pair in the vicinity of a voice coil motor arm of the suspension. When voltages are impressed in such directions that the piezoelectric element on one side extends and the piezoelectric element on the other side contracts, the head is rotated in the direction of the piezoelectric element on which the voltage in the contracting direction is impressed.

In the above structure, the suspension and the arm are perfectly separated by the piezoelectric material, so that there is a problem as to secure the strength of the brittle piezoelectric material itself and the strength of the joint portion between the piezoelectric material and the suspension or the arm.

Furthermore, the conventional actuator utilizing the piezoelectric elements has the demerits of low productivity and high cost. Because of the above-mentioned problems, the actuator utilizing the piezoelectric elements has not yet been put to practical use.

Of the conventional micro-actuators utilizing the electromagnetic force of type (3) above, one in which a tip end portion of the arm of the voice coil motor being a coarse actuator is made to be a stator of the micro-actuator and a suspension rotatably attached to the tip end of the arm is made to be a rotor, has been proposed (Koganezawa et al., IEEE TRANSACTIONS ON MAGNETICS, Vol. 32, No. 5, Sep. 1996, pp. 3908–3910). However, such a structure in which a shaft and the like are provided has the problem that the structure of an attachment portion is complicated and the productivity is low.

Furthermore, a micro-actuator has hitherto been proposed in which a stator is provided on a suspension, and a slider mounted on the tip end of the suspension via a hinge is driven by a long rotor extending from the stator portion to an upper portion of the slider (U.S. Pat. No. 6,295,185). In such a structure, however, compatibility of elasticity in the driving direction and translational rigidity in the vertical direction is difficult to secure for the hinge, so that it is difficult to enlarge the displacement amount while maintaining strength. Further, since the rotor makes frictional contact with the suspension or the like at least in the vicinity of the hinge, it is inappropriate to mount such an actuator in the inside of the magnetic recording disk drive in which a clean atmosphere must be maintained.

On the other hand, a micro-actuator has hitherto been proposed in which a rotor is disposed between the slider and the gimbal and both sides of the rotor fixed so as to surround the slider are connected to an attachment portion for attachment to the gimbal through very small leaf springs (called micro-beams) (U.S. Pat. No. 6,078,473).

In this actuator, a stator is disposed at the attachment portion for attachment to the gimbal or at the gimbal portion. In this structure, by regulating the material for the micro-beams, the number of the micro-beams, the aspect ratio of the section of the micro-beams, and the like, it is possible to simultaneously secure both elasticity in the driving direction and translational rigidity in the other directions, so that the servo band of the actuator can be enlarged, and positioning precision can be enhanced.

However, the micro-beams of the micro-actuator are produced as one body with the slider attachment portion and the rotor portion by deep etching of a single crystal of silicon, and the etching depth is as large as 100 to 200 μm, so that the productivity is low.

SUMMARY OF THE INVENTION

Accordingly, it is an object of the present invention to provide a suspension for magnetic head which has a novel structure including a gimbal, micro-beams and a rotor portion as one body and which enables a micro-actuator for a magnetic recording disk drive to be incorporated by a simple technique, irrespective of which one of electrostatic force, electrostriction and electromagnetic force is utilized for the micro-actuator.

The present invention has been completed as a result of earnest investigations for attaining the above object. In accordance with the present invention, the following suspensions for magnetic head are provided.

[I] A suspension for magnetic head, for supporting a magnetic head slider on which a magnetic head for recording/reproduction of information on a magnetic recording medium is mounted, wherein one end of the suspension is fixed to a stator portion fixed to the tip end of a load beam of the suspension, a gimbal portion and a rotor portion oscillatably supported by metallic micro-beams formed by bending are provided on the side of the other end of the suspension, and the magnetic head slider is attached to the gimbal portion, whereby the rotor portion and the magnetic head slider attached to the gimbal portion as one body with the rotor portion can be oscillated in parallel to the surface of a magnetic recording disk, independently of the driving by a coarse actuator consisting of positioning the slider roughly to a predetermined track through oscillation of an arm of a voice coil motor.

[II] A suspension for magnetic head as set forth in [I] above, wherein a pair of the micro-beams are disposed on both sides of the rotor portion and the gimbal portion, support the magnetic head slider through the gimbal portion, are sufficiently displaced in the tracking direction of the disk by a small driving force, and have high rigidity in the other directions.

[III] A suspension for magnetic head, for supporting a magnetic head slider on which a magnetic head for recording/reproduction of information on a magnetic recording medium is mounted, wherein a stator portion is provided at one end of the suspension in the gimbal portion, a slider attachment portion and a rotor portion oscillatably supported by metallic micro-beams formed by bending are provided on the side of the other end of the suspension, and the magnetic head slider is attached to the slider attachment portion, whereby the rotor portion and the magnetic head slider attached to the gimbal portion as one body with the rotor portion can be oscillated in parallel to the surface of a magnetic recording disk, independently of the driving by a coarse actuator consisting of positioning the slider roughly to a predetermined track through oscillation of an arm of a voice coil motor.

[IV] A suspension for magnetic head as set forth in [III] above, wherein a pair of the micro-beams are disposed on both sides of the rotor portion and the gimbal portion, support the magnetic head slider through the gimbal portion, are sufficiently displaced in the tracking direction of the disk by a small driving force, and have high rigidity in the other directions.

[V] A suspension for magnetic head as set forth in any one of [I] to [IV] above, wherein the micro-beams are integral with a fixing portion for fixing to the suspension, the rotor portion and the gimbal portion, and includes at least one folded-back portion.

[VI] A suspension for magnetic head as set forth in any one of [I] to [V] above, including an actuator using an electrostatic force between the stator portion and the rotor portion, so as thereby to oscillate the rotor portion and the magnetic head slider attached to the gimbal portion as one body with the rotor portion.

[VII] A suspension for magnetic head as set forth in any one of [I] to [V] above, including an actuator using a piezoelectric material between the stator portion and the rotor portion, so as thereby to oscillate the rotor portion and the magnetic head slider attached to the gimbal portion as one body with the rotor portion.

[VIII] A suspension for magnetic head as set forth in any one of [I] to [V] above, including an actuator using a magnetostrictive material between the stator portion and the rotor portion, so as thereby to oscillate the rotor portion and the magnetic head slider attached to the gimbal portion as one body with the rotor portion.

[IX] A suspension for magnetic head as set forth in any one of [I] to [V] above, including an actuator utilizing an electromagnetic force between the stator portion and the rotor portion, so as thereby to oscillate the rotor portion and the magnetic head slider attached to the gimbal portion as one body with the rotor portion.

[X] A suspension for magnetic head as set forth in [IX] above, wherein a ferromagnetic alloy is used for the suspension to form a magnetic circuit.

[XI] A suspension for magnetic head as set forth in [IX] above, wherein a ferromagnetic alloy is used for the rotor portion to form a magnetic circuit.

According to the present invention, it is possible to easily manufacture a micro-actuator for magnetic recording disk drive which can accurately position a magnetic head.

BRIEF DESCRIPTION OF THE DRAWINGS

FIGS. 3A to 3C are perspective views showing one example of processing and deformation of the suspension for magnetic head according to the first embodiment, in which

FIGS. 4A to 4C are perspective views showing another example of processing and deformation of the suspension for magnetic head according to the first embodiment, in which

DESCRIPTION OF THE PREFERRED EMBODIMENTS

Now, specific embodiments of the suspension for magnetic head according to the present invention will be described in detail below.

Figure 1:
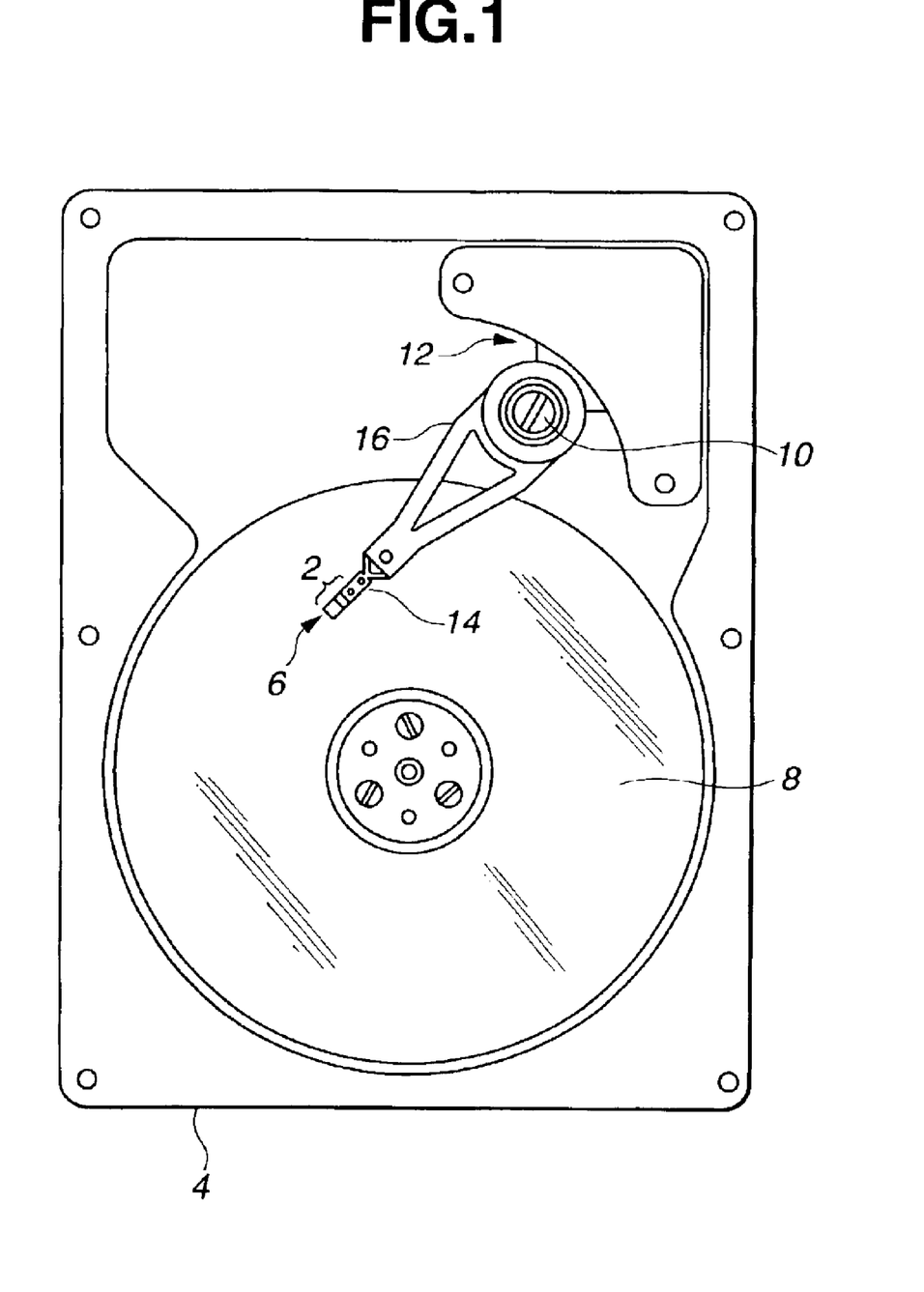
FIG. 1 is a plan view of a magnetic recording disk drive including a suspension for magnetic head according to a first embodiment of the present invention.

FIG. 1 is a plan view showing one example of a magnetic recording disk drive 4 including a suspension for magnetic head according to the present invention. In this example, a coarse actuator for positioning a magnetic head slider 6 to a predetermined track on a disk 8 is included of a voice coil motor (VCM) 12 including an arm 16 which is moved with a pivot rotational shaft 10 as a center. A load beam 14 is attached to a tip end portion of the VCM arm 16.

Figure 2:
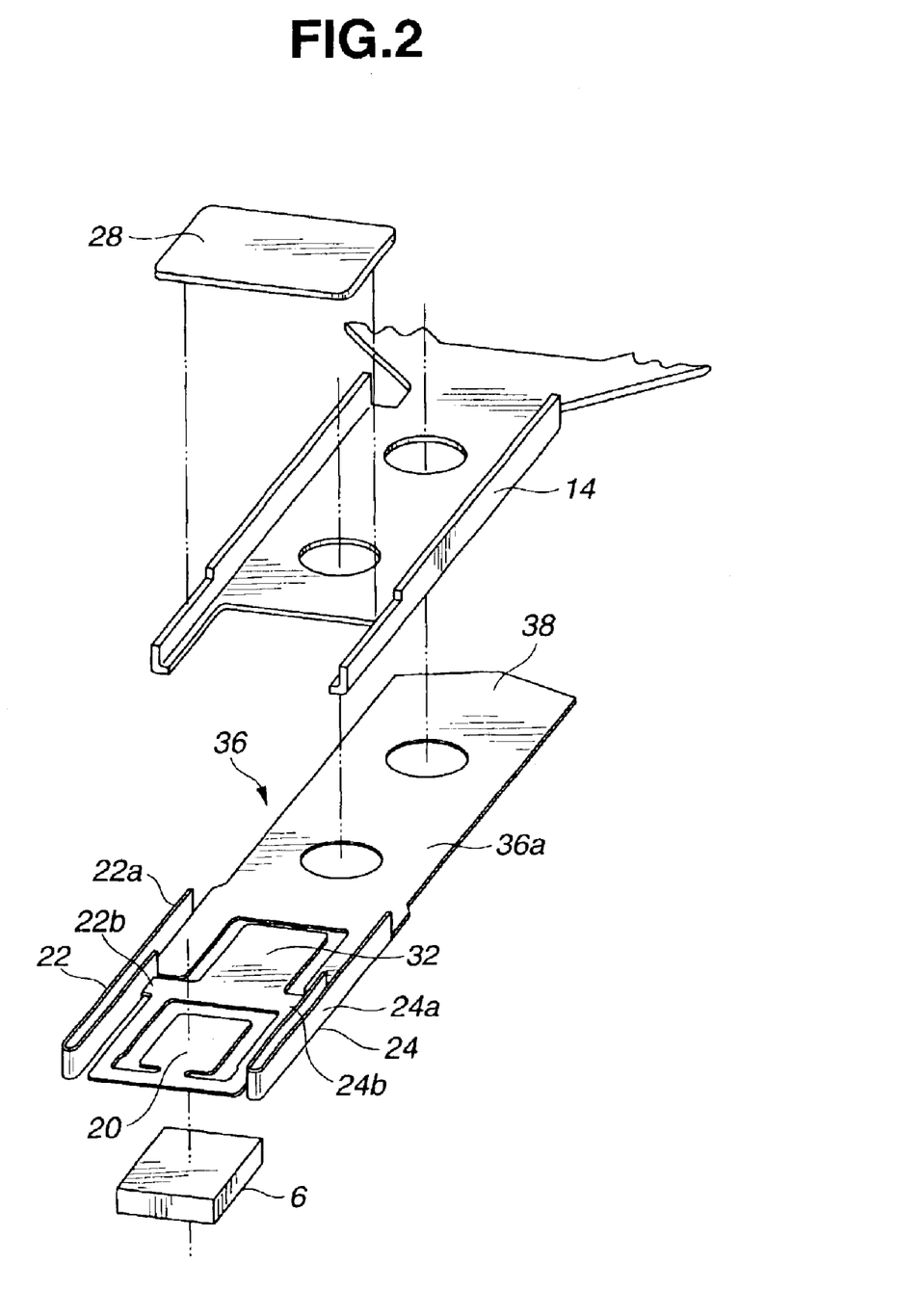
FIG. 2 is an exploded perspective view of the suspension for magnetic head according to the first embodiment.

FIG. 2 shows an exploded view of a suspension for magnetic head according to a first embodiment of the present invention. A component part 36 constituting a gimbal portion 20, micro-beams 22 and 24 and a rotor portion 32 is attached to a tip end portion of the load beam 14. More in detail, the micro-beams 22 and 24 have a structure in which long pieces 22a and 24a integrally connected respectively to both side edges of a tip end portion of a suspension component part main body 36a are bent substantially perpendicularly to the side of the load beam 14 along the both side edges, the long pieces 22a and 24a are folded back substantially by 180° to the inside at the tip end position of the suspension component part main body 36a, and a gimbal portion 20 and a rotor portion 32 are integrally connected to the tip ends of the long pieces 22a and 24a through joint portions 22b and 24b, respectively. A head slider 6 including a magnetic head (not shown) for reading/writing of data on a magnetic recording disk is attached to the gimbal portion 20. If required, a stator portion 28 is attached to a tip end portion of the load beam 14. The stator portion 28 is fixed, for example, by an epoxy based adhesive or by soldering, welding or the like. The stator portion 28 may be formed as one body with the load beam 14.

With the stator portion 28 and the rotor portion 32 respectively provided with electrodes, a micro-actuator utilizing an electrostatic force is formed. In this case, since the micro-beams 22 and 24 support the magnetic head slider 6 oscillatably, the degree of freedom in designing the electrodes is drastically enlarged.

When a piezoelectric material is disposed between the stator portion 28 and the rotor portion 32, a micro-actuator utilizing electrostriction is formed. In this case, since the micro-beams 22 and 24 support the magnetic head slider 6, a high strength is not required at the piezoelectric material itself or at the adhesion interface, so that the degree of freedom of design is enlarged.

With electromagnets or permanent magnets disposed at the stator portion 28 and the rotor portion 32, a micro-actuator utilizing an electromagnetic force is formed.

Further, when a magnetostrictive material is disposed and adhered between the stator portion 28 and the rotor portion 32 and an electromagnet for impressing an electric field or the like is disposed in the surroundings of the magnetostrictive material, a micro-actuator utilizing magnetostriction is formed.

The component part 36 constituted of an attachment portion 38 for attachment to the load beam 14, the micro-beams 22 and 24, the gimbal portion 20 and the rotor portion 32 is formed of a steel based spring material in the same manner as the gimbal in a conventional suspension for magnetic head, and has a thickness of about 0.025 to 0.1 mm.

The micro-beams 22 and 24 extend from the side of the load beam 14 toward the side of the head slider 6, are once folded at the tip ends thereof, and return to the side of the load beam 14, where they support the rotor portion 32 and the gimbal portion 20. This structure has the same effect as an arrangement of two beams on one side, and can maintain a high rigidity in the vertical direction and the like directions while maintaining elasticity in the tracking direction of the disk, as compared with the case of one beam. Two or more fold points may be provided for obtaining predetermined elasticity and translational rigidity.

Figure 3A:
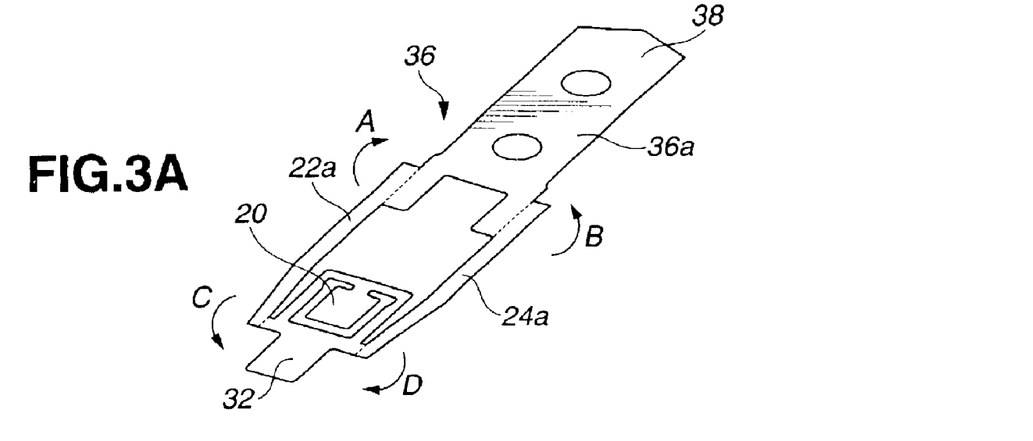
FIG. 3A shows the condition where a sheet is blanked by press working or etching.
Figure 3B:
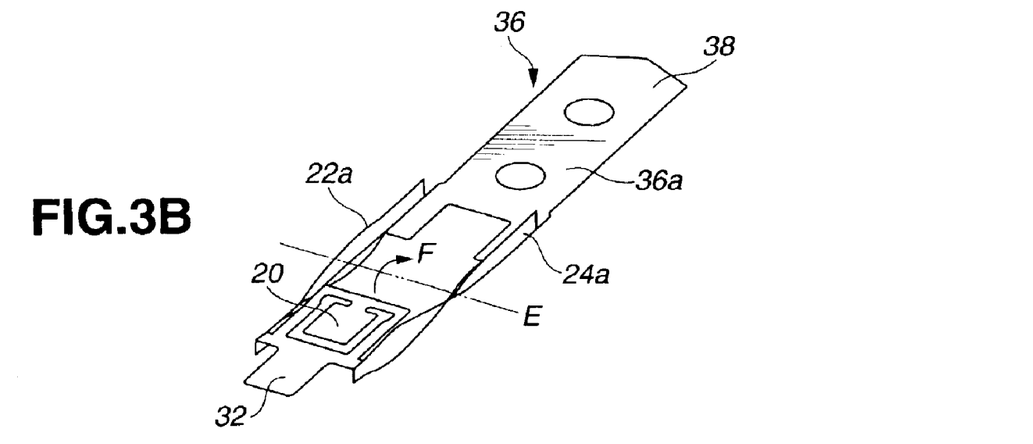
FIG. 3B shows the condition where the sheet of FIG. 3A is bent in directions A to D.
Figure 3C:
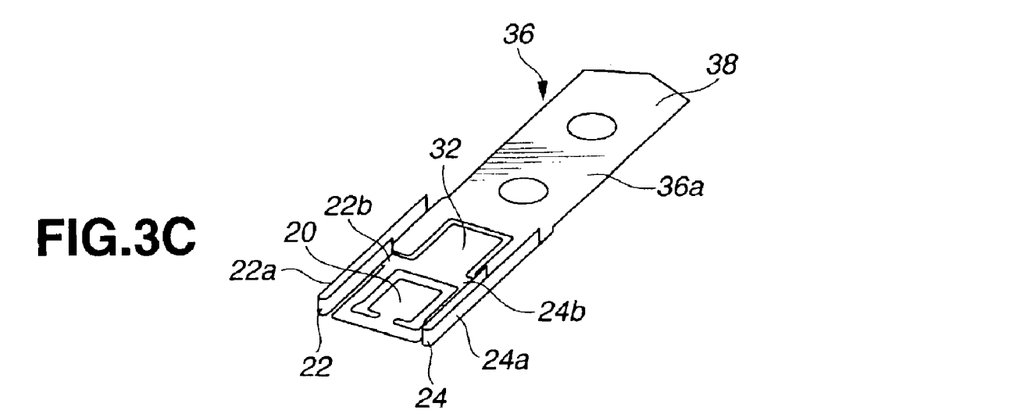
FIG. 3C shows the condition where the sheet of FIG. 3B is folded in direction F.

The micro-beams 22 and 24 are produced by blanking a sheet by press working or etching in the same manner as the gimbal in a conventional suspension, and then bending the blanked sheet. The manner of processing and deformation in this case is as shown in FIG. 3. First, the component part 36 after blanking the sheet by press working or etching is as shown in FIG. 3A, where the positions of the rotor portion 32 and the gimbal portion 20 are reversed with respect to the attachment portion 38 for attachment to the load beam. Both ends on the side of a fixing portion for fixing to the load beam are bent perpendicularly in the manner of forming a valley as indicated by arrows A and B, and the sides of the rotor portion 32 and the gimbal portion 20 are bent in the manner of forming a ridge as indicated by arrows C and D, resulting in the condition where the two micro-beams 22 and 24 are twisted, as shown in FIG. 3B. Next, the rotor portion 32 and the gimbal portion 20 are rotated by 180° as indicated by arrow F with the straight line E connecting between midpoints of the micro-beams as an axis of rotation, and the midpoint portions of the micro-beams are bent at an appropriate curvature in the manner of folding back the micro-beams, resulting in the condition shown in FIG. 3C. In order to perform the series of processing with high accuracy, the portions to be bent may be preliminarily provided with a bending line.

Figure 4A:
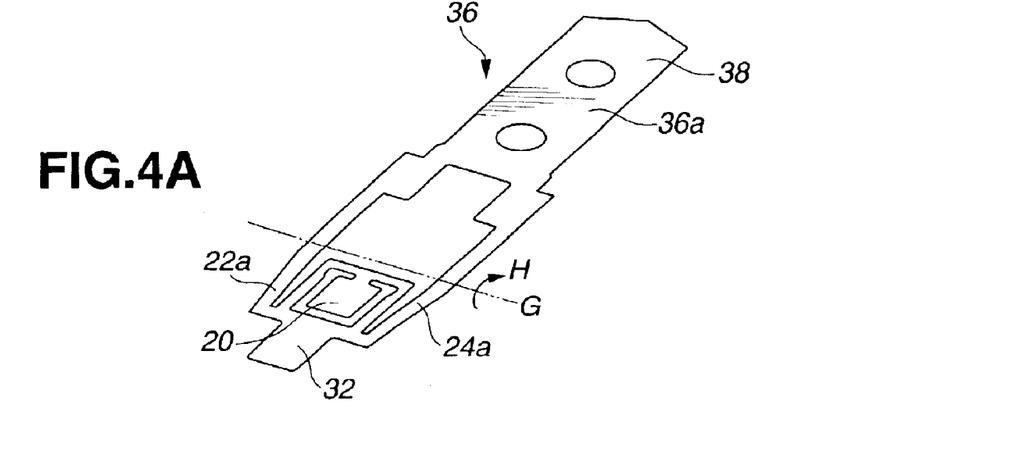
FIG. 4A shows the condition where a sheet is blanked by press working or etching.
Figure 4B:
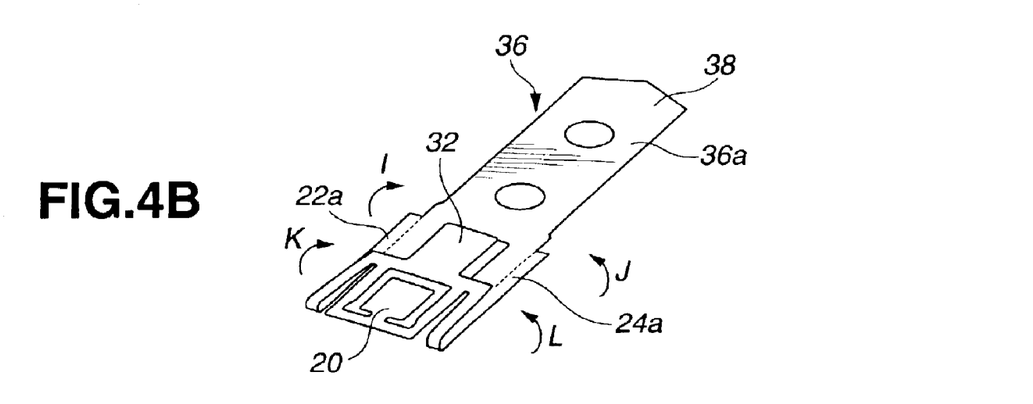
FIG. 4B shows the condition where the sheet of FIG. 4A is folded in direction H.
Figure 4C:
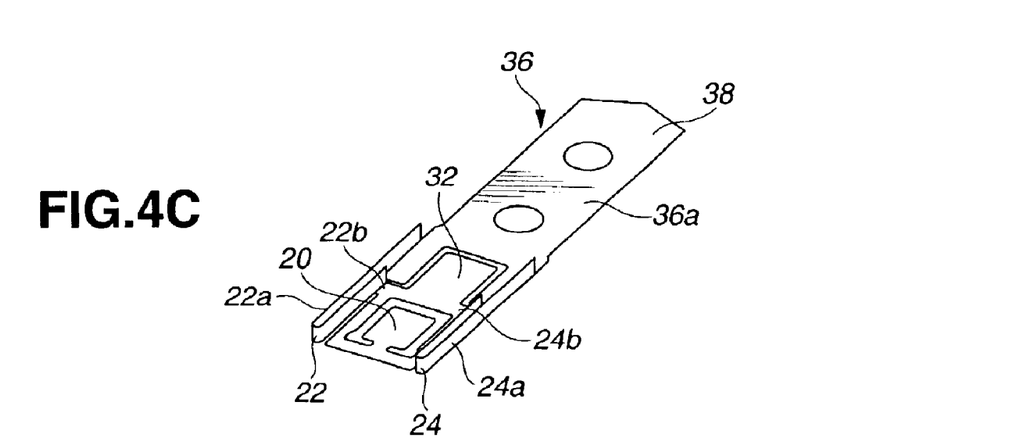
FIG. 4C shows the condition where the sheet of FIG. 4B is bent in directions I to L.

FIG. 4 shows another manner of processing and deformation. A component part 36 after blanking a sheet by press working or etching is subjected to a processing in which fold-back portions of the micro-beams indicated by a straight line G are bent at a predetermined curvature as indicated by arrow H, as shown in FIG. 4A. Next, as shown in FIG. 4B, both ends on the side of a fixing portion for fixing to the load beam and the sides of the rotor portion and the gimbal portion are bent perpendicularly in the manner of forming a valley as indicated by arrows I, J, K and L, resulting in the condition shown in FIG. 4C.

Figure 5:
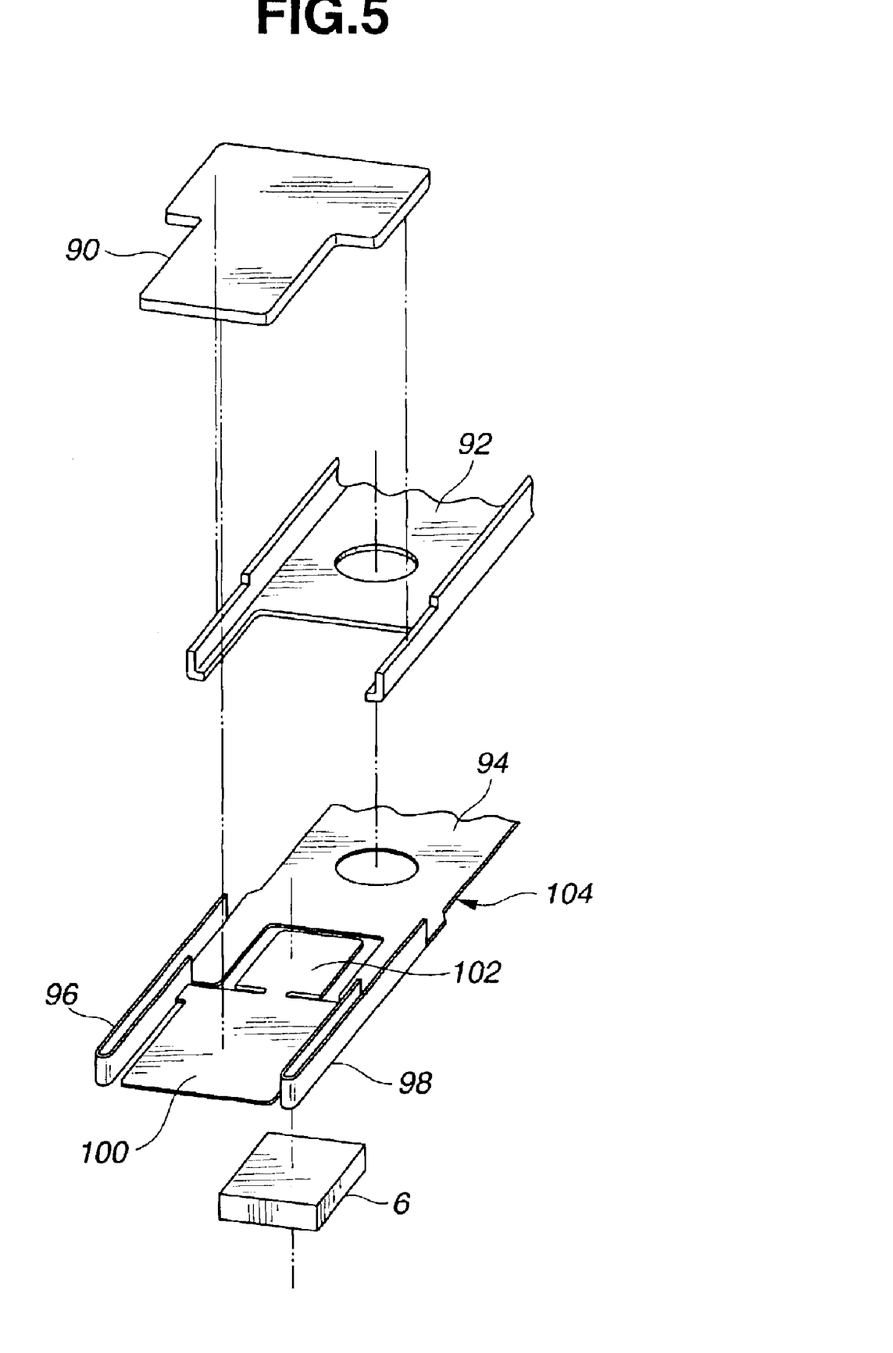
FIG. 5 is an exploded perspective view of a suspension for magnetic head according to a second embodiment.

FIG. 5 shows an exploded perspective view of a suspension for magnetic head according to a second embodiment of the present invention. In this embodiment, a rotor portion 100 is provided between the micro-beams 96 and 98, and a gimbal portion 102 is provided on the rear side of the rotor portion 100, i.e., on the side of an attachment portion 94 for attachment to the load beam. As shown in FIG. 5, the stator portion 90 may be projected toward the front side by the amount by which the rotor portion 100 is moved toward the front side.

Figure 6:
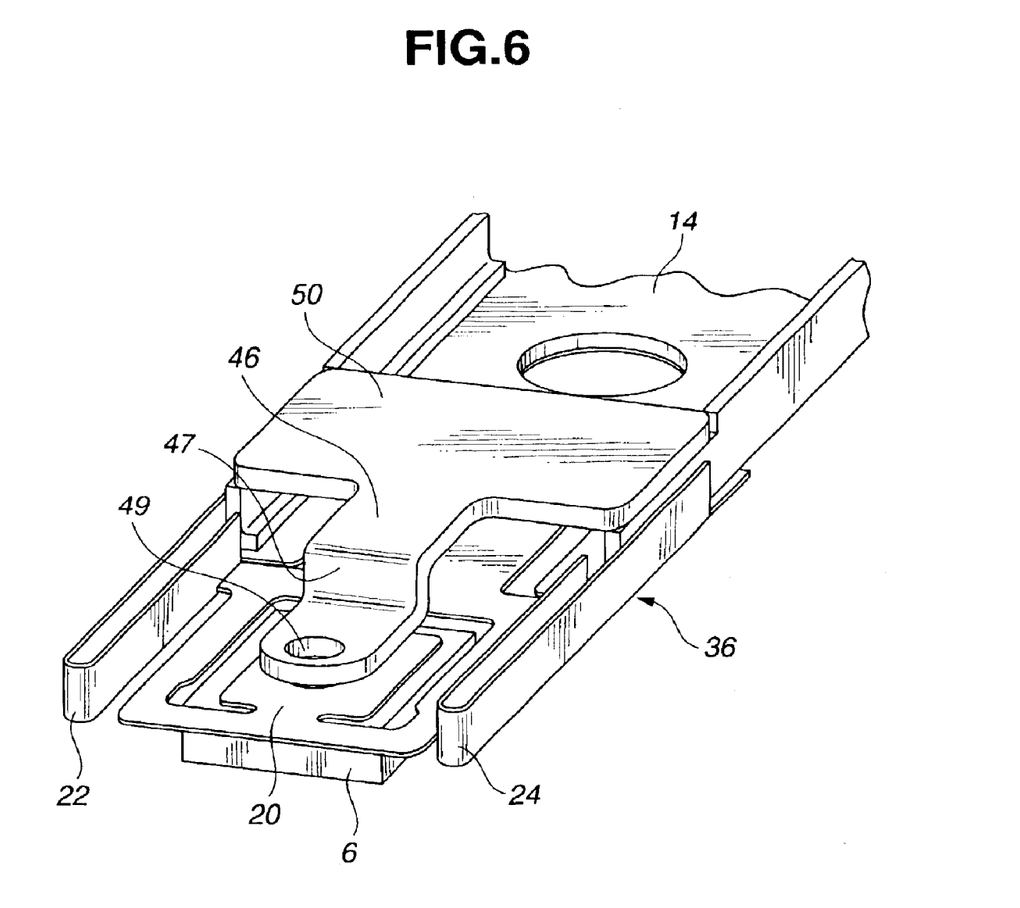
FIG. 6 is an exploded perspective view of a suspension for magnetic head according to a third embodiment.

FIG. 6 shows an exploded perspective view of a suspension for magnetic head according to a third embodiment of the present invention. In this embodiment, a beam 46 is attached to the front side of the stator portion 50 in the first embodiment, and, further, the tip end of the beam 46 is provided with a hollow 49. The hollow 49 makes point contact with a gimbal portion 20, thereby playing the role of exerting a pre-load on a head slider 6. If required, a bend portion 47 may be provided.

Figure 7:
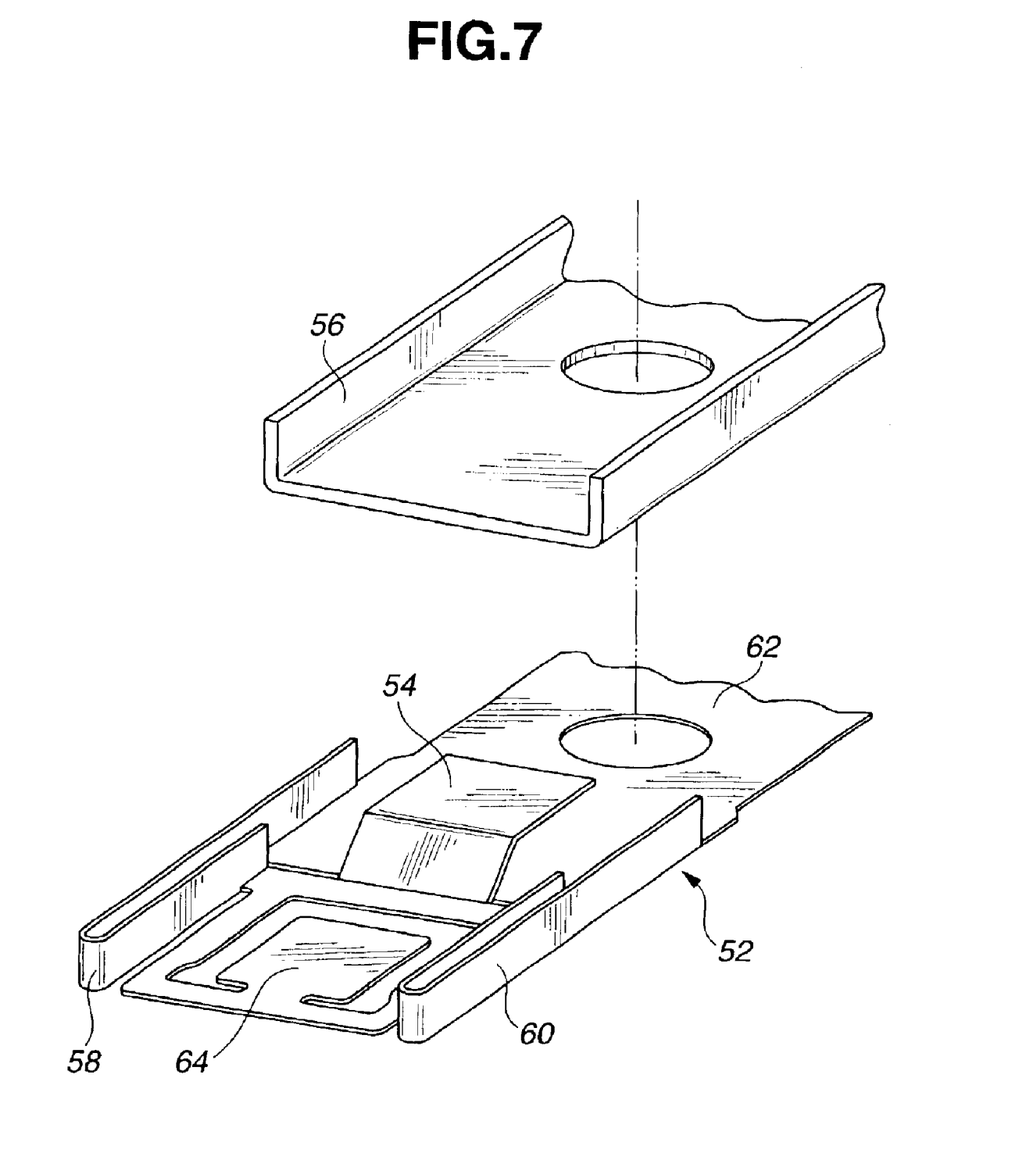
FIG. 7 is an exploded perspective view of a suspension for magnetic head according to a fourth embodiment.

Referring to FIG. 7, there is shown an exploded view of a suspension for magnetic head according to a fourth embodiment of the present invention. In this embodiment, a rotor portion 54 is bent to be higher than a gimbal portion 64 by about 0.3 to 1.5 mm, and the tip end of a load beam 56 is clamped between the rotor portion 54 and an attachment portion 62 in assembly. In the case of this embodiment, the tip end of the load beam 56 functions also as a stator portion, whereby the stator component part 28 used in the first embodiment can be omitted.

Figure 8:
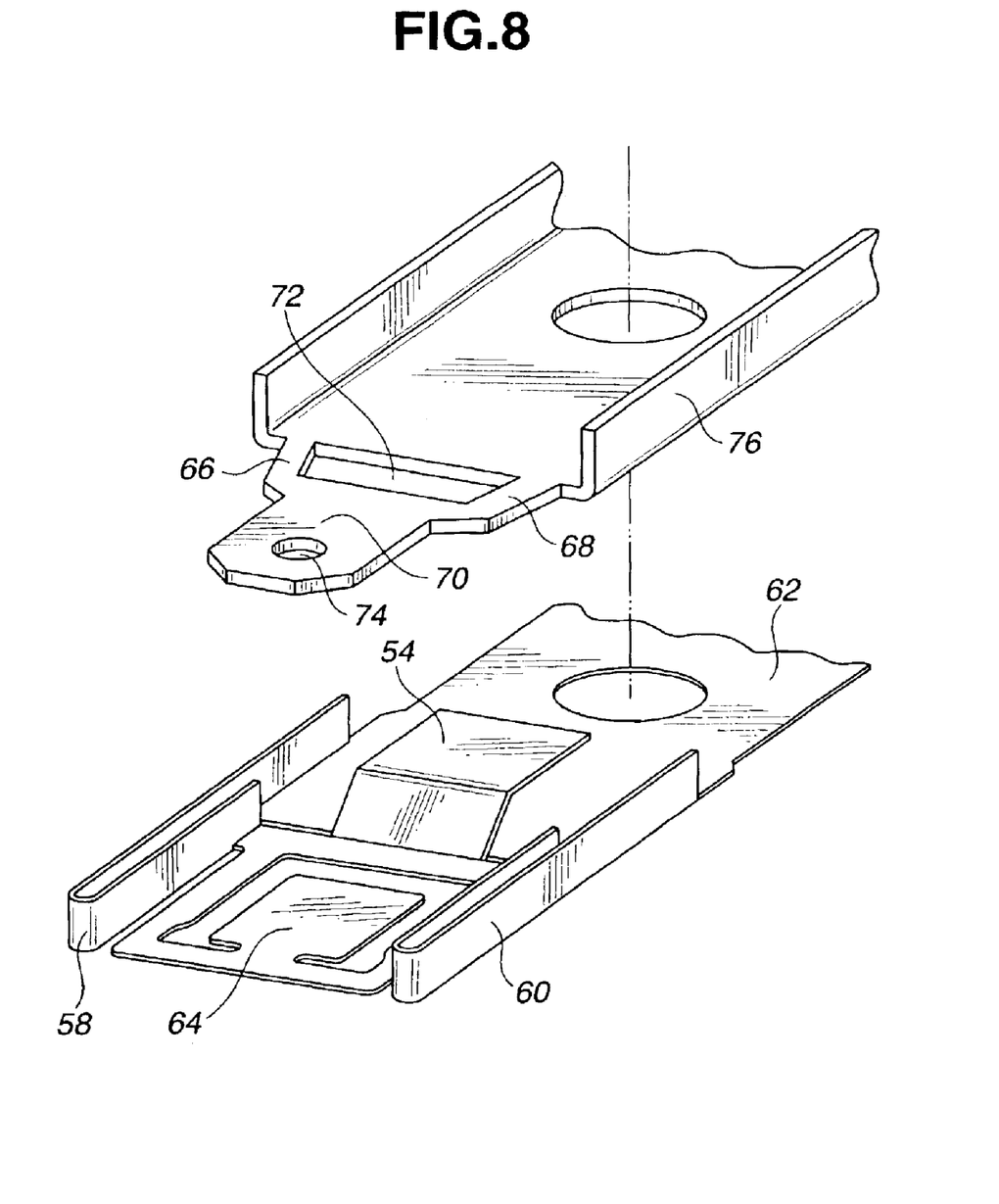
FIG. 8 is an exploded perspective view of a suspension for magnetic head according to a fifth embodiment.
Figure 9:
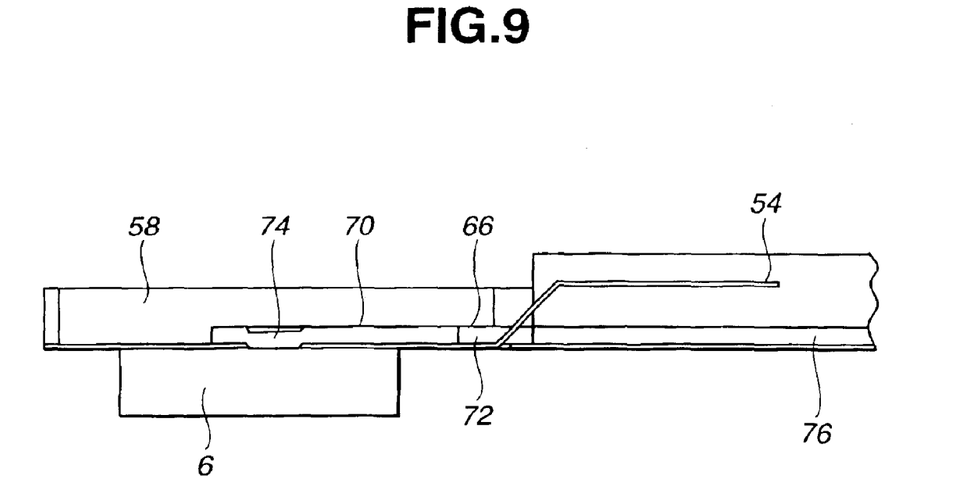
FIG. 9 is a sectional view of the suspension for magnetic head according to the fifth embodiment.

Referring to FIG. 8, there is shown an exploded perspective view of a suspension for magnetic head according to a fifth embodiment of the present invention. In this embodiment, a hole portion 72 formed by beams 66 and 68 extending from the left and the right and a flat portion 70 integrally projected at the tip ends of the beams 66 and 68 in the manner of bridging therebetween is provided at the tip of the load beam 76 in the fourth embodiment, and the flat portion 70 is provided with a hollow 74. The suspension has its rotor portion 54 attached to the load beam 76 through the hole portion 72 of the load beam 76. FIG. 9 shows a partial sectional view of the suspension for magnetic head according to this embodiment. In the case of this embodiment, since the tip end of the load beam 76 functions also as a stator portion, the stator component part 28 used in the first embodiment can be omitted, and, in addition, it is possible to exert a pre-load on a slider without increasing the number of component parts.

Figure 10:
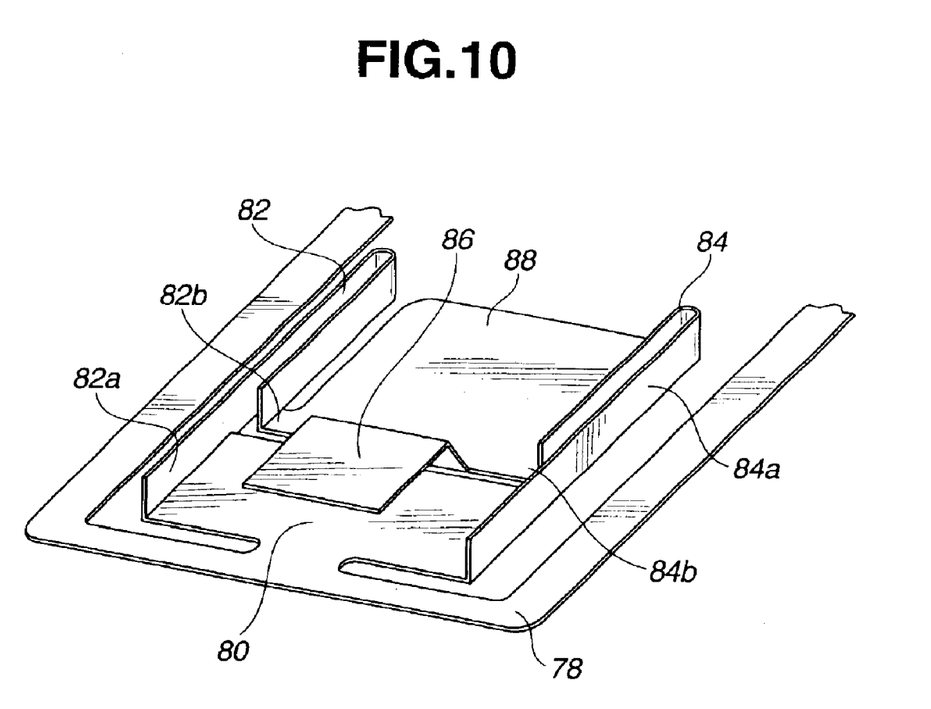
FIG. 10 is a partial enlarged perspective view of a suspension for magnetic head according to a sixth embodiment.

Referring to FIG. 10, there is shown an enlarged perspective view of a tip end portion of a component part according to a sixth embodiment of the present invention. In this embodiment, a stator portion 80, micro-beams 82 and 84, a rotor portion 86 and a slider attachment portion 88 are disposed in the inside of a gimbal portion 78. In the case of this embodiment, with the stator portion, the micro-beams and the rotor portion contained in the gimbal portion, a further reduction in size can be realized.

In this embodiment, the rotor portion 86 and the slider attachment portion 88 are integrally connected to the micro-beams 82 and 84 through joint portions 82b and 84b thereof. In this case, long pieces 82a and 84a forming the micro-beams 82 and 84 are integrally connected to both side edges of the stator portion 80, and are bent at the both side edges; besides, the long pieces 82a and 84a are extended toward the rear side (the load beam side), and are folded back at predetermined extension positions, and the rotor portion 86 and the slider attachment portion 88 are integrally connected thereto through the joint portions 82b and 84b, as described above. In this case, also, the same effects as those of the first to fifth embodiments are displayed.

As has been described above, according to the present invention, it is possible to provide a suspension for magnetic head in which a magnetic head actuator capable of achieving an accurate positioning can be incorporated by a simple technique.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A disk drive comprising:
    a magnetic recording disk having a surface containing a plurality of tracks for recording/reproduction of information;
    a voice coil motor;
    an arm responsive to the voice coil moor for placing the arm in operable relation to the surface of the disk;
    a coarse actuator capable of positioning the arm roughly to a predetermined track through oscillation of the arm;
    a load beam carried by the arm;
    a stator carried by the load beam;
    a gimbal carried by the load beam by means of metallic micro-beams;
    a magnetic head slider carried by the gimbal;
    a magnetic head carried by the magnetic head slider; and
    a rotor carried by the load beam;
    whereby said rotor and said magnetic head slider can be oscillated parallel to the surface of the magnetic recording disk, independently of the positioning of the coarse actuator when the coarse actuator positions the arm and the magnetic head slider roughly to a predetermined track through oscillation of the arm.

2. A disk drive comprising
    a magnetic recording disk having a surface containing a plurality of tracks for recording and for reproducing information,
    a voice coil motor,
    an arm responsive to the voice coil motor for placing the arm in operable relation to the surface of the disk,
    a coarse actuator capable of positioning the arm roughly to a predetermined track through oscillation of the arm,
    a load beam carried by the arm,
    a stator fixed to the tip end portion of the load beam,
    a component part attached to the tip end portion of the load beam and having a gimbal, metallic micro-beams formed by bending and a rotor, the gimbal and the rotor oscillatably supporting by the micro-beams, and
    a magnetic head slider attached to the gimbal and having a magnetic head,
    whereby said rotor and said magnetic head slider can be oscillated parallel to the surface of the magnetic recording disk, independently of the positioning of the coarse actuator when the coarse actuator positions the arm and the magnetic head slider roughly to a predetermined track through oscillation of the arm.

3. The disk drive of claim 2, wherein the micro-beams have a structure in which two long pieces integrally connected respectively to both side edges of a tip end portion of a suspension component part main body are bend substantially perpendicularly to the side of the load beam along the both side edges, the long pieces are folded back substantially by 180° to the inside at the tip end position of the suspension component part main body, and the gimbal and the rotor are integrally connected to the tip ends of the long pieces, respectively.

4. The disk drive of claim 2, wherein said micro-beams are integral with a fixing portion for fixing to said suspension, said rotor portion and said gimbal portion, and has at least one folded-back portion.

5. The disk drive of claim 2, comprising an actuator utilizing an electrostatic force between said stator portion and said rotor portion, so as thereby to oscillate said rotor portion and said magnetic head slider attached to said gimbal portion as one body with said rotor portion.

6. The disk drive of claim 2, comprising an actuator using a piezoelectric material between said stator portion and said rotor portion, so as thereby to oscillate said rotor portion and said magnetic head slider attached to said gimbal portion as one body with said rotor portion.

7. The disk drive of claim 2, comprising an actuator using a magnetostrictive material between said stator portion and said rotor portion, so as thereby to oscillate said rotor portion and said magnetic head slider-attached to the gimbal portion as one body with said rotor portion.

8. The disk drive of claim 2, comprising an actuator utilizing an electromagnetic force between said stator portion and said rotor portion, so as thereby to oscillate said rotor portion and said magnetic head slider attached to said gimbal portion as one body with said rotor portion.

9. The disk drive of claim 8, wherein a ferromagnetic alloy is used for said suspension to form a magnetic circuit.

10. The disk drive of claim 8, wherein a ferromagnetic alloy is used for said rotor portion to form a magnetic circuit.

11. A disk drive comprising
a magnetic recording disk having a surface containing a plurality of tracks for recording and for reproducing information,
a voice coil motor,
an arm responsive to the voice coil motor for placing the arm in operable relation to the surface of the disk,
a coarse actuator capable of positioning the arm roughly to a predetermined track through oscillation of the arm,
a load beam carried by the arm,
a stator fixed to the tip end portion of the load beam,
a component part attached to the tip end portion of the load beam and having a gimbal, a stator, metallic micro-beams formed by bending, a slider attachment and a rotor so that the stator, the micro-beams, the slider attachment and the rotor being disposed in the inside of the gimbal, and the slider attachment and the rotor oscillatably supported by the micro-beams, and
a magnetic head slider attached to the slider attachment and having a magnetic head,
whereby said rotor and said magnetic head slider can be oscillated parallel to the surface of the magnetic recording disk, independently of the positioning of the coarse actuator when the coarse actuator positions the arm and the magnetic head slider roughly to a predetermined track through oscillation of the arm.

12. The disk drive of claim 11, wherein the micro-beams have a structure in which two long pieces forming the micro-beams are integrally connected to both side edges of the stator, are bent substantially perpendicularly to the side of the load beam along the both side edges, the long pieces are folded back substantially by 180° to the inside and the slider attachment and the rotor are integrally connected to the tip ends of the long pieces, respectively.

13. The disk drive of claim 12, wherein said micro-beams are integral with a fixing portion for fixing to said suspension, said rotor portion and said gimbal portion, and has at least one folded-back portion.

14. The disk drive of claim 11, comprising an actuator utilizing an electrostatic force between said stator portion and said rotor portion, so as thereby to oscillate said rotor portion and said magnetic head slider attached to said gimbal portion as one body with said rotor portion.

15. The disk drive of claim 11, comprising an actuator using a piezoelectric material between said stator portion and said rotor portion, so as thereby to oscillate said rotor portion and said magnetic head slider attached to said gimbal portion as one body with said rotor portion.

16. The disk drive of claim 11, comprising an actuator using a magnetostrictive material between said stator portion and said rotor portion, so as thereby to oscillate said rotor portion and said magnetic head slider attached to the gimbal portion as one body with said rotor portion.

17. The disk drive of claim 11, comprising an actuator utilizing an electromagnetic force between said stator portion and said rotor portion, so as thereby to oscillate said rotor portion and said magnetic head slider attached to said gimbal portion as one body with said rotor portion.

18. The disk drive of claim 17, wherein a ferromagnetic alloy is used for said suspension to form a magnetic circuit.

19. The disk drive of claim 17, wherein a ferromagnetic alloy is used for said rotor portion to form a magnetic circuit.

* * * * *